United States Patent
Zhang et al.

(10) Patent No.: US 9,762,348 B2
(45) Date of Patent: Sep. 12, 2017

(54) RECONFIGURABLE OPTICAL ADD-DROP MULTIPLEXER APPARATUS

(71) Applicant: Huawei Marine Networks Co., Ltd., Tianjin (CN)

(72) Inventors: Wendou Zhang, Wuhan (CN); Changwu Xu, Beijing (CN); Liping Ma, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 0 days.

(21) Appl. No.: 15/153,517

(22) Filed: May 12, 2016

(65) Prior Publication Data

US 2016/0261360 A1 Sep. 8, 2016

Related U.S. Application Data

(63) Continuation of application No. PCT/CN2013/087090, filed on Nov. 13, 2013.

(51) Int. Cl.
*H04J 14/02* (2006.01)
*G02B 6/293* (2006.01)

(52) U.S. Cl.
CPC ...... *H04J 14/0212* (2013.01); *G02B 6/29382* (2013.01); *H04J 14/021* (2013.01); *H04J 14/0205* (2013.01); *H04J 14/0215* (2013.01); *H04J 14/0221* (2013.01); *H04J 14/0291* (2013.01)

(58) Field of Classification Search
CPC .. H04J 14/0212; H04J 14/0205; H04J 14/021; H04J 14/0215; H04J 14/0221; H04J 14/0291; G02B 6/29382

USPC ............................................. 398/83
See application file for complete search history.

(56) References Cited

U.S. PATENT DOCUMENTS

| 9,276,672 | B2* | 3/2016 | Zhang ............ H04B 10/071 |
| 2007/0264008 | A1* | 11/2007 | Zaacks ........... H04J 14/0227 |
| | | | 398/3 |
| 2010/0008672 | A1 | 1/2010 | Kovsh |
| 2010/0124391 | A1* | 5/2010 | Feuer ............ H04J 14/0204 |
| | | | 385/24 |

(Continued)

FOREIGN PATENT DOCUMENTS

| CN | 1852070 A | 10/2006 |
| CN | 101040473 A | 9/2007 |

(Continued)

OTHER PUBLICATIONS

Xu et al., "Study on the Reconfigurable Multi-channel Optical Add/Drop Multiplexer," ACTA Photonica Sinica, vol. 33, No. 9, pp. 1085-1089 (Sep. 2004).

*Primary Examiner* — Ken N Vanderpuye
*Assistant Examiner* — Abbas H Alagheband
(74) *Attorney, Agent, or Firm* — Leydig, Voit & Mayer, Ltd.

(57) ABSTRACT

Embodiments of the present invention provide a reconfigurable optical add-drop multiplexer apparatus, and relate to the field of communications, so as to solve the problem of inconvenient line failure detection. The ROADM apparatus includes: a first ROADM, a second ROADM, one splitting coupler, four optical amplifiers, and four couplers. The embodiments of the present invention are used in a communications line architecture.

8 Claims, 8 Drawing Sheets

(56) References Cited

U.S. PATENT DOCUMENTS

| | | | |
|---|---|---|---|
| 2010/0290786 A1* | 11/2010 | Abbott | H04J 14/0204 398/79 |
| 2011/0200322 A1 | 8/2011 | Kovsh et al. | |
| 2011/0249969 A1* | 10/2011 | Ji | H04B 10/60 398/45 |
| 2012/0201536 A1 | 8/2012 | Liu et al. | |
| 2012/0224170 A1* | 9/2012 | Hisamoto | H04B 10/077 356/73.1 |
| 2013/0039647 A1 | 2/2013 | Yamashita | |
| 2013/0223837 A1* | 8/2013 | Zhang | H04J 14/0202 398/7 |
| 2013/0294770 A1 | 11/2013 | Hino et al. | |
| 2013/0315591 A1* | 11/2013 | Inoue | H04J 14/0209 398/48 |
| 2014/0086573 A1* | 3/2014 | Zhang | H04B 10/071 398/16 |
| 2014/0255020 A1* | 9/2014 | Zhang | H04J 14/0201 398/3 |
| 2014/0355981 A1* | 12/2014 | Miyazaki | H04J 14/021 398/38 |

FOREIGN PATENT DOCUMENTS

| | | |
|---|---|---|
| CN | 101588219 A | 11/2009 |
| CN | 101667879 A | 3/2010 |
| CN | 102742199 A | 10/2012 |
| CN | 102801464 A | 11/2012 |
| CN | 102823173 A | 12/2012 |
| CN | 102959883 A | 3/2013 |
| CN | 103190094 A | 7/2013 |
| EP | 1788833 A | 5/2007 |
| KR | 20020054211 A | 7/2002 |
| WO | WO 2012086537 A1 | 6/2012 |

* cited by examiner

RECONFIGURABLE OPTICAL ADD-DROP MULTIPLEXER APPARATUS

CROSS-REFERENCE TO RELATED APPLICATIONS

This application is a continuation of International Patent Application No. PCT/CN2013/087090, filed on Nov. 13, 2013, which is hereby incorporated by reference in its entirety.

TECHNICAL FIELD

The present invention relates to the field of communications, and in particular, to a reconfigurable optical add-drop multiplexer apparatus.

BACKGROUND

With the development of information technologies, submarine cable networks cover major sea areas, and the submarine cable network has become a main communications network that bears international communications services. A submarine cable communications system for implementing the submarine cable network achieves, by using an optical add-drop multiplexer (Optical add-drop Multiplexer, OADM for short), service communication between multiple connected sites, and also features a high price/performance ratio, a short delay, and a high availability. However, in the prior art, however, an optical add-drop multiplexer apparatus that uses an OADM branch device is inflexible in routing, and if a bandwidth needs to be changed, the optical add-drop multiplexer apparatus needs to be taken out of water to replace the OADM branch device. A reconfigurable optical add-drop multiplexer (Reconfigurable Optical add-drop Multiplexer, ROADM for short) is designed in the industry regarding this problem, so that a requirement for an adjustable bandwidth of an add/drop wave is met and flexible routing is implemented.

However, in the prior art, when a trunk transmission line or a branch transmission line of a line fails, a failure detection path provided by the ROADM is a reverse path of a detection signal input path. The ROADM has multiple reconfiguration states; therefore, in a case in which the reconfiguration state of the ROADM cannot be acquired, a transmission path of a returned signal cannot be learned, that is, it cannot be determined whether a trunk transmission line or a branch transmission line of the line fails. In addition, after the reconfiguration state of the ROADM is set, a returned signal acquired at a signal input port can only be used for failure detection of one transmission path, which causes inconvenience to line failure detection.

SUMMARY

Embodiments of the present invention provide a reconfigurable optical add-drop multiplexer apparatus, so as to solve the problem of inconvenient line failure detection.

According to a first aspect of the present invention, a reconfigurable optical add-drop multiplexer apparatus is provided, including:

a first input end, a first output end, a second input end, a second output end, a first downloading end, a second downloading end, a first uploading end, and a second uploading end, where:

the first input end is connected to an input end of a first optical amplifier, an output end of the first optical amplifier is connected to an input end of a first reconfigurable optical add-drop multiplexer ROADM, and an output end of the first ROADM is connected to the first output end;

the first uploading end is connected to an input end of a third optical amplifier, an output end of the third optical amplifier is connected to an uploading end of the first ROADM, and a downloading end of the first ROADM is connected to the first downloading end;

the second input end is connected to an input end of the second optical amplifier, an output end of the second optical amplifier is connected to an input end of a second ROADM, and an output end of the second ROADM is connected to the second output end;

the second uploading end is connected to an input end of a fourth optical amplifier, an output end of the fourth optical amplifier is connected to an uploading end of the second ROADM, and a downloading end of the second ROADM is connected to the second downloading end;

a first coupler is disposed between the output end of the first ROADM and the first output end, where a first input end of the first coupler is connected to the output end of the first ROADM, and a first output end of the first coupler is connected to the first output end;

a second coupler is connected between the output end of the second ROADM and the second output end, where a first input end of the second coupler is connected to the output end of the second ROADM, and a first output end of the second coupler is connected to the second output end;

a third coupler is connected between the downloading end of the first ROADM and the first downloading end, where a first input end of the third coupler is connected to the downloading end of the first ROADM, and a first output end of the third coupler is connected to the first downloading end; and a fourth coupler is connected between the downloading end of the second ROADM and the second downloading end, where a first input end of the fourth coupler is connected to the downloading end of the second ROADM, and a first output end of the fourth coupler is connected to the second downloading end, where a second input end of the first coupler is connected to a first input end of a splitting coupler, a second input end of the second coupler is connected to a first output end of the splitting coupler, a second input end of the third coupler is connected to a second input end of the splitting coupler, and a second input end of the fourth coupler is connected to a second output end of the splitting coupler; and the splitting coupler is configured to couple a reverse optical signal generated by the first output end or the first downloading end and return the coupled reverse optical signal to the second output end for outputting;

or, couple the reverse optical signal generated by the second output end or the second downloading end and return the coupled reverse optical signal to the first output end for outputting;

or, couple a reverse optical signal generated by the first output end or the first downloading end and return the coupled reverse optical signal to the second downloading end for outputting;

or, couple a reverse optical signal generated by the second output end or the second downloading end and return the coupled reverse optical signal to the first downloading end for outputting.

With reference to the first aspect, in a first possible implementation manner, the reconfigurable optical add-drop multiplexer apparatus further includes: four command receiving modules and one control module:

a first command receiving module disposed between the first input end and the first optical amplifier, where an input end of the first command receiving module is connected to the first input end, and an output end of the first command receiving module is connected to the input end of the first optical amplifier;

a second command receiving module disposed between the second input end and the second optical amplifier, where an input end of the second command receiving module is connected to the second input end, and an output end of the second command receiving module is connected to the input end of the second optical amplifier;

a third command receiving module disposed between the first uploading end and the third optical amplifier, where an input end of the third command receiving module is connected to the first uploading end, and an output end of the third command receiving module is connected to the input end of the third optical amplifier; and a fourth command receiving module disposed between the second uploading end and the fourth optical amplifier, where an input end of the fourth command receiving module is connected to the second uploading end, and an output end of the fourth command receiving module is connected to the input end of the fourth optical amplifier, where a control command output end of the first command receiving module, a control command output end of the second command receiving module, a control command output end of the third command receiving module, and a control signal output end of the fourth command receiving module are all connected to the control module, and are configured to input a control command to the control module according to a received path connectivity signal, and the control module is further connected to the first ROADM and the second ROADM, and is configured to convert the control command into a control signal and send the control signal to the first ROADM or the second ROADM, so as to change a reconfiguration state of a corresponding ROADM.

With reference to the first possible implementation manner of the first aspect, in a second possible implementation manner, each command receiving module includes:

a splitter and a photodiode, where an input end of the splitter is connected to the first input end, the second input end, the first uploading end, or the second uploading end; an input end of the photodiode is coupled to a first output end of the splitter; a second output end of the splitter is connected to an input end of a corresponding optical amplifier; and an output end of the photodiode is connected to the control module, and is configured to convert a path connectivity signal output by the splitter into the control command, and output the control command to the control module.

With reference to the second possible implementation manner of the first aspect, in a third possible implementation manner, a filter is connected in series between the splitter and the photodiode.

With reference to any one of the first to the third possible implementation manners of the first aspect, in a fourth possible implementation manner, the splitting coupler is a 2×2 optical switch, and the 2×2 optical switch is connected to the control module, and is configured to change a switch state under control of the control module, and couple a reverse optical signal generated by the first output end or the first downloading end and return the coupled reverse optical signal to the second output end for outputting;

or, couple a reverse optical signal generated by the second output end or the second downloading end and return the coupled reverse optical signal to the first output end for outputting;

or, couple a reverse optical signal generated by the first output end or the first downloading end and return the coupled reverse optical signal to the second downloading end for outputting;

or, couple a reverse optical signal generated by the second output end or the second downloading end and return the coupled reverse optical signal to the first downloading end for outputting, where the switch state includes a crossed state and a parallel state.

With reference to the first aspect, in a fifth possible implementation manner, the splitting coupler is a 2×2 coupler.

With reference to the first aspect or any possible implementation manner of the first aspect, in a sixth possible implementation manner, the first input end, the second input end, the first uploading end, and the second uploading end are configured to input a detection signal; and the reverse optical signal includes back scattering light of the detection signal received by at least one port at the first output end, the second output end, the first downloading end, and the second downloading end.

With reference to the sixth possible implementation manner of the first aspect, in a seventh possible implementation manner, the reverse optical signal further includes: a selectively reflected part of detection signals that are received by the at least one port at the first output end, the second output end, the first downloading end, and the second downloading end;

at least one of the first coupler, the second coupler, the third coupler, and the fourth coupler is a 2×2 coupler;

a second output end of the 2×2 coupler is connected to an input end of one attenuator, and an output end of the attenuator is connected to one wavelength-selective reflector; and the wavelength-selective reflector is configured to selectively reflect a part of detection signals to form the reverse optical signal.

According to the reconfigurable optical add-drop multiplexer apparatus that is provided by the embodiments of the present invention, a line failure is detected by using a loopback transmission path that is provided by four couplers and one splitting coupler for a reverse optical signal, which facilitates line failure detection.

BRIEF DESCRIPTION OF DRAWINGS

To describe technical solutions in embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes technical solutions in embodiments of the present invention with reference to accompanying drawings in the embodiments of the present invention. Apparently, the described embodiments are merely a part rather than all of the embodiments of the present invention.

The embodiments of the present invention are applicable to a communications network system, and in particular, are applicable to a submarine cable communications system. The embodiments of the present invention use the submarine cable communications system as an example for description.

Figure 1:
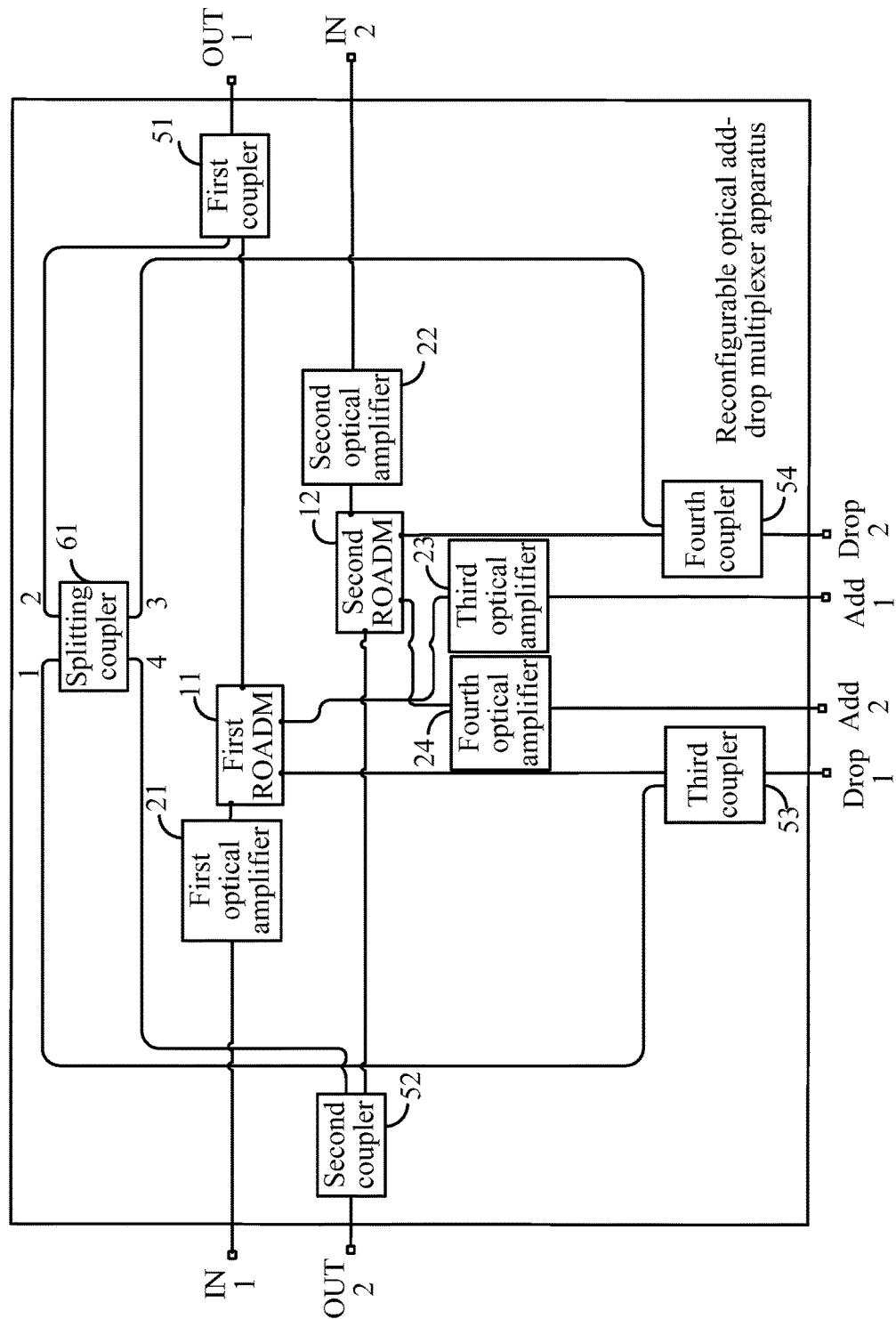
FIG. 1 is a schematic structural diagram of a reconfigurable optical add-drop multiplexer apparatus according to an embodiment of the present invention.

FIG. 1 is a schematic diagram of a reconfigurable optical add-drop multiplexer apparatus according to an embodiment of the present invention. Referring to FIG. 1, the reconfigurable optical add-drop multiplexer apparatus includes the following:

a first input end IN1, a first output end OUT1, a second input end IN2, a second output end OUT2, a first downloading end DROP1, a second downloading end DROP2, a first uploading end Add 1, and a second uploading end Add 2, where the first input end IN1 is connected to an input end of a first optical amplifier 21, an output end of the first optical amplifier 21 is connected to an input end of a first reconfigurable optical add-drop multiplexer ROADM 11, and an output end of the first ROADM 11 is connected to the first output end OUT1;

the first uploading end Add 1 is connected to an input end of a third optical amplifier 23, an output end of the third optical amplifier 23 is connected to an uploading end of the first ROADM 11, and a downloading end of the first ROADM 11 is connected to the first downloading end DROP1;

the second input end IN2 is connected to an input end of the second optical amplifier 22, an output end of the second optical amplifier 22 is connected to an input end of a second ROADM 12, and an output end of the second ROADM 12 is connected to the second output end OUT2;

the second uploading end ADD2 is connected to an input end of a fourth optical amplifier 24, an output end of the fourth optical amplifier 24 is connected to an uploading end of the second ROADM 12, and a downloading end of the second ROADM 12 is connected to the second downloading end DROP2;

a first coupler 51 is disposed between the output end of the first ROADM 11 and the first output end OUT1, where a first input end of the first coupler 51 is connected to the output end of the first ROADM 11, and a first output end of the first coupler 51 is connected to the first output end OUT1;

a second coupler 52 is connected between the output end of the second ROADM 12 and the second output end OUT2, where a first input end of the second coupler 52 is connected to the output end of the second ROADM 12, and a first output end of the second coupler 52 is connected to the second output end OUT2;

a third coupler 53 is connected between the downloading end of the first ROADM 11 and the first downloading end DROP1, where a first input end of the third coupler 53 is connected to the downloading end of the first ROADM 11, and a first output end of the third coupler 53 is connected to the first downloading end DROP1; and a fourth coupler 54 is connected between the downloading end of the second ROADM 12 and the second downloading end DROP2, where a first input end of the fourth coupler 54 is connected to the downloading end of the second ROADM 12, and a first output end of the fourth coupler 54 is connected to the second downloading end DROP2, where a second input end of the first coupler 51 is connected to a first input end of a splitting coupler 61, a second input end of the second coupler 52 is connected to a first output end of the splitting coupler 61, a second input end of the third coupler 53 is connected to a second input end of the splitting coupler 61, and a second input end of the fourth coupler 54 is connected to a second output end of the splitting coupler 61; and the splitting coupler 61 is configured to couple a reverse optical signal generated by the first output end OUT1 or the first downloading end DROP1 and return the coupled reverse optical signal to the second output end OUT2 for outputting;

or, couple a reverse optical signal generated by the second output end OUT2 or the second downloading end DROP2 and return the coupled reverse optical signal to the first output end OUT1 for outputting;

or, couple a reverse optical signal generated by the first output end OUT1 or the first downloading end DROP1 and return the coupled reverse optical signal to the second downloading end DROP2 for outputting;

or, couple a reverse optical signal generated by the second output end OUT2 or the second downloading end DROP2 and return the coupled reverse optical signal to the first downloading end DROP1 for outputting.

Specifically, as shown in FIG. 1, a downlink trunk transmission line exists between the first input end IN1 and the first output end OUT1, an uplink trunk transmission line exists between the second input end IN2 and the second output end OUT2, and signals are transmitted on the two trunk transmission lines in opposite directions. A transmission line between the first downloading end DROP1 and the downloading end of the first ROADM and a transmission line between the first uploading end ADD1 and the uploading end of the first ROADM are downlink branch transmission lines; and a transmission line between the second downloading end DROP2 and the downloading end of the second ROADM and a transmission line between the second uploading end ADD2 and the uploading end of the second ROADM are uplink branch transmission lines.

The first ROADM 11 is connected in series on the downlink trunk transmission line, the second ROADM 12 is connected in series on the uplink trunk transmission line, and the first ROADM 11 and the second ROADM 12 each include four ports: an input end, an output end, an uploading end, and a downloading end. A first input end IN1 of the downlink trunk transmission line is connected to the input end of the first ROADM 11, a first output end OUT1 of the downlink trunk transmission line is connected to the output end of the first ROADM 11, the uploading end of the first ROADM 11 is connected to a first uploading end ADD1 of the downlink branch transmission line, and the downloading end of the first ROADM 11 is connected to an output end of the downlink branch transmission line; and a second input end IN2 of the uplink trunk transmission line is connected to the input end of the second ROADM 12, a second output end OUT2 of the uplink trunk transmission line is connected to the output end of the second ROADM 12, the uploading end of the second ROADM 12 is connected to a second uploading end ADD2 of the uplink branch transmission line, and the downloading end of the second ROADM 12 is connected to a second downloading end DROP2 of the uplink branch transmission line.

Referring to the splitting coupler 61 in FIG. 1, the splitting coupler 61 is a dual-input dual-output coupler, and the splitting coupler 61, the first coupler, the second coupler, the third coupler, and the fourth coupler jointly form a loopback path of the reverse optical signal, where a port 1 (the second input end of the splitting coupler) is connected to the third coupler 53 (the second input end of the third coupler), and is configured to receive the reverse optical signal returned by the DROP1, or send, to the third coupler 53, the reverse optical signal returned by the DROP2, or send, to the third coupler 53, the reverse optical signal returned by the OUT2; a port 2 (the first input end of the splitting coupler) is connected to the first coupler 51 (the second input end of the first coupler), and is configured to receive the reverse optical signal returned by the OUT1, or couple, to the first coupler 51, the reverse optical signal returned by the OUT2, or is configured to couple, to the first coupler 51, the reverse optical signal returned by the DROP2; a port 3 (the second output end of the splitting coupler) is connected to the fourth coupler 54 (the second input end of the fourth coupler), and is configured to receive the reverse optical signal returned by the DROP2, or couple, to the fourth coupler 54, the reverse optical signal returned by the OUT1, or couple, to the fourth coupler 54, the reverse optical signal returned by the DROP1; and a port 4 (the second input end of the splitting coupler) is connected to the second coupler 52 (the second input end of the third coupler), and is configured to receive the reverse optical signal returned by the OUT2, or couple, to the second coupler 52, the reverse optical signal returned by the OUT1, or couple, to the second coupler 52, the reverse optical signal returned by the DROP1.

Optical amplifiers (21 to 24) are configured to perform insertion loss compensation on an incoming detection signal, and in each optical amplifier, reverse noise light is isolated by using at least one optical isolator; and in each optical amplifier, at least one optical isolator is used to isolate spontaneous emission noise generated in the optical amplifier, so that back scattering light does not return along an original path. The back scattering light can return to a signal transmit end station along the loopback path after the foregoing loopback path is set, which adaptively solves line detection of an ROADM system.

In the reconfigurable optical add-drop multiplexer apparatus according to the embodiment of the present invention, a line failure is detected by using a loopback transmission path provided by four couplers and one splitting coupler for a reverse optical signal, which facilitates line failure detection.

Figure 2:
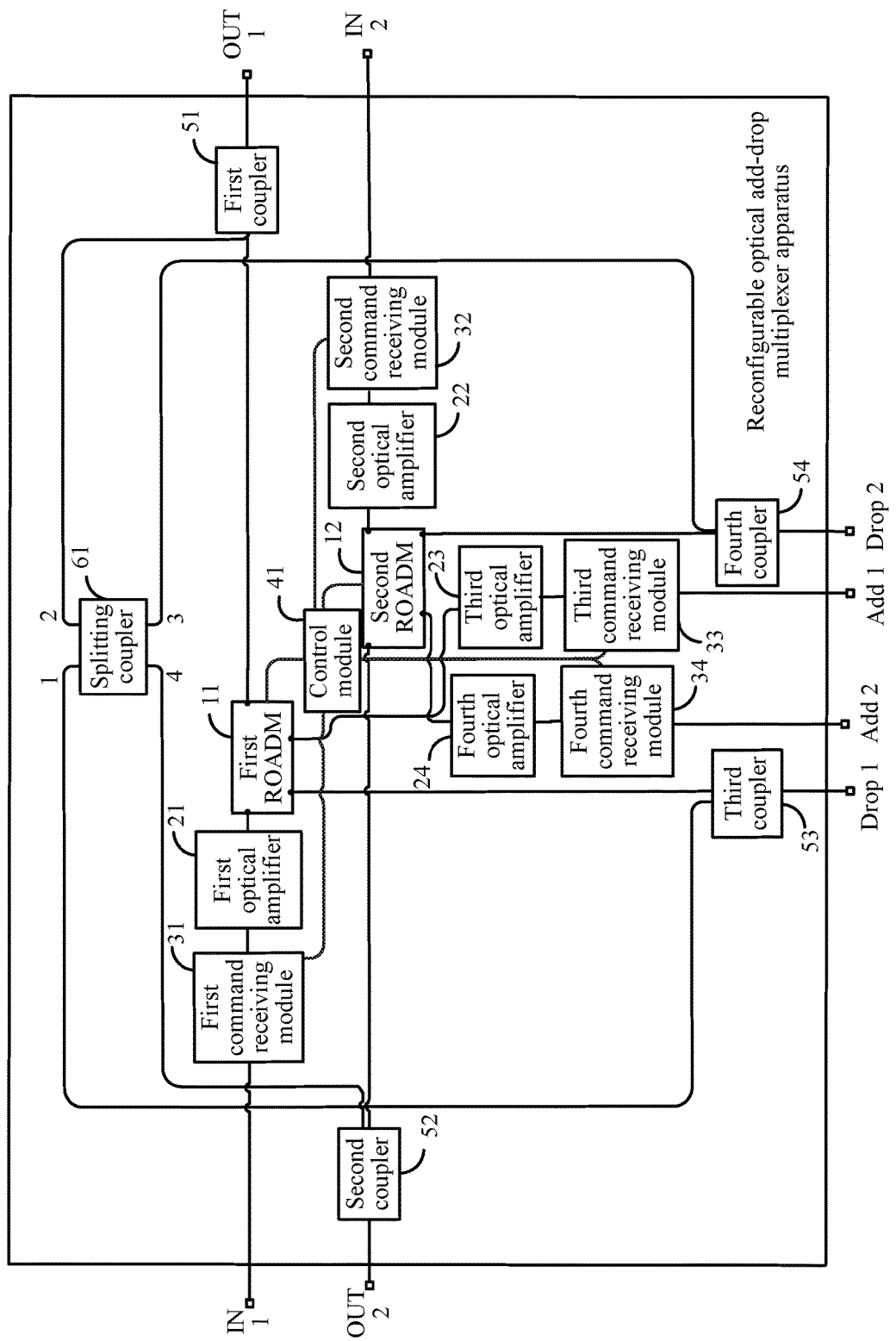
FIG. 2 is a schematic structural diagram of a reconfigurable optical add-drop multiplexer apparatus according to another embodiment of the present invention.

Based on the embodiment corresponding to FIG. 1, referring to FIG. 2, the reconfigurable optical add-drop multiplexer apparatus further includes: four command receiving modules and one control module:

a first command receiving module 31 disposed between the first input end IN1 and the first optical amplifier 21, where an input end of the first command receiving module 31 is connected to the first input end IN1, and an output end of the first command receiving module 31 is connected to the input end of the first optical amplifier 21;

a second command receiving module 32 disposed between the second input end IN2 and the second optical amplifier 22, where an input end of the second command receiving module 32 is connected to the second input end IN2, and an output end of the second command receiving module 32 is connected to the input end of the second optical amplifier 22;

a third command receiving module 33 disposed between the first uploading end ADD1 and the third optical amplifier 23, where an input end of the third command receiving module 33 is connected to the first uploading end ADD1, and an output end of the third command receiving module 33 is connected to the input end of the third optical amplifier 23; and a fourth command receiving module 34 disposed between the second uploading end ADD2 and the fourth optical amplifier 24, where an input end of the fourth command receiving module 34 is connected to the second uploading end ADD2, and an output end of the fourth command receiving module 34 is connected to the input end of the fourth optical amplifier 24, where a control command output end of the first command receiving module 31, a control command output end of the second command receiving module 32, a control command output end of the third command receiving module 33, and a control command output end of the fourth command receiving module 34 are all connected to the control module 41, and are configured to input a control command to the control module 41 according to a received path connectivity signal, and the control module 41 is further connected to the first ROADM 11 and the second ROADM 12, and is configured to convert the control command into a control signal and send the control signal to the first ROADM 11 or the second ROADM 12, so as to change a reconfiguration state of a corresponding ROADM.

Further optionally, the first input end IN1, the second input end IN2, the first uploading end ADD1, and the second uploading end ADD2 are configured to input a detection signal; and the reverse optical signal includes back scattering light of the detection signal received by at least one port at the first output end, the second output end, the first downloading end, and the second downloading end.

The reconfigurable optical add-drop multiplexer apparatus is generally used in a submarine cable communications system, and is configured to transmit service signals of multiple wavelengths of a bearer data transmission service.

For the service signals, a reconfiguration state of the ROADM includes complete pass-through, partial pass-through, partial downloading, and partial uploading; and when the ROADM is applied to line failure detection, a detection signal for a submarine cable line is used, and for the detection signal, the reconfiguration state of the ROADM includes two types: one type is a pass-through state, and the other type is non-pass-through state. Using the first ROADM as an example, when the first ROADM is in the pass-through state, the detection signal input from the IN1 is transmitted to the OUT1 by using the output end of the first ROADM, and the detection signal input from the Add1 is transmitted to the Drop1 by using the output end of the first ROADM; and when the first ROADM is in the non-pass-through state, the detection signal input from the IN1 is transmitted to the DROP1 by using the downloading end of the first ROADM, and the detection signal input from the Add 1 is transmitted to the OUT1 by using the output end of the first ROADM. This is similar for the second ROADM, and details are not provided again. The reverse optical signal is back scattering light that is generated by the detection signal in a transmission optical fiber connected to the first output end OUT1, the second output end OUT2, the first downloading end DROP1, or the second downloading end DROP2. Referring to FIG. 2, the control module 41 is connected to the first command receiving module 31, the second command receiving module 32, the third command receiving module 33, the fourth command receiving module 34, the first ROADM 11, and the second ROADM 12, and is configured to control, according to a control command of the first command receiving module 31, the second command receiving module 32, the third command receiving module 33, or the fourth command receiving module 34, a reconfiguration state of the first ROADM 11 or the second ROADM 12 to be the pass-through state, so that a detection signal input from the IN1 of the trunk transmission line is output from the output end OUT1 of the trunk transmission line, a detection signal input from the IN2 of the trunk transmission line is output from the output end OUT2 of the trunk transmission line, a detection signal input from the ADD1 of the branch transmission line is output from the output end Drop1 of the branch transmission line, and a detection signal input from the ADD2 of the branch transmission line is output from the output end Drop of the branch transmission line; or control a reconfiguration state of the first ROADM 11 or the second ROADM 12 to be the non-pass-through state, so that a detection signal input from the IN1 of the trunk transmission line is output from the output end DROP1 of the downlink branch line, a detection signal input from the IN2 of the trunk transmission line is output from the output end DROP2 of the uplink branch line and is output from the output end DROP2 of the uplink branch line, a detection signal input from the ADD1 of the downlink branch transmission line is output from the output end Out1 of the downlink trunk line, and a detection signal input from the ADD2 of the uplink branch transmission line is output from the output end OUT2 of the uplink line.

Figure 3:
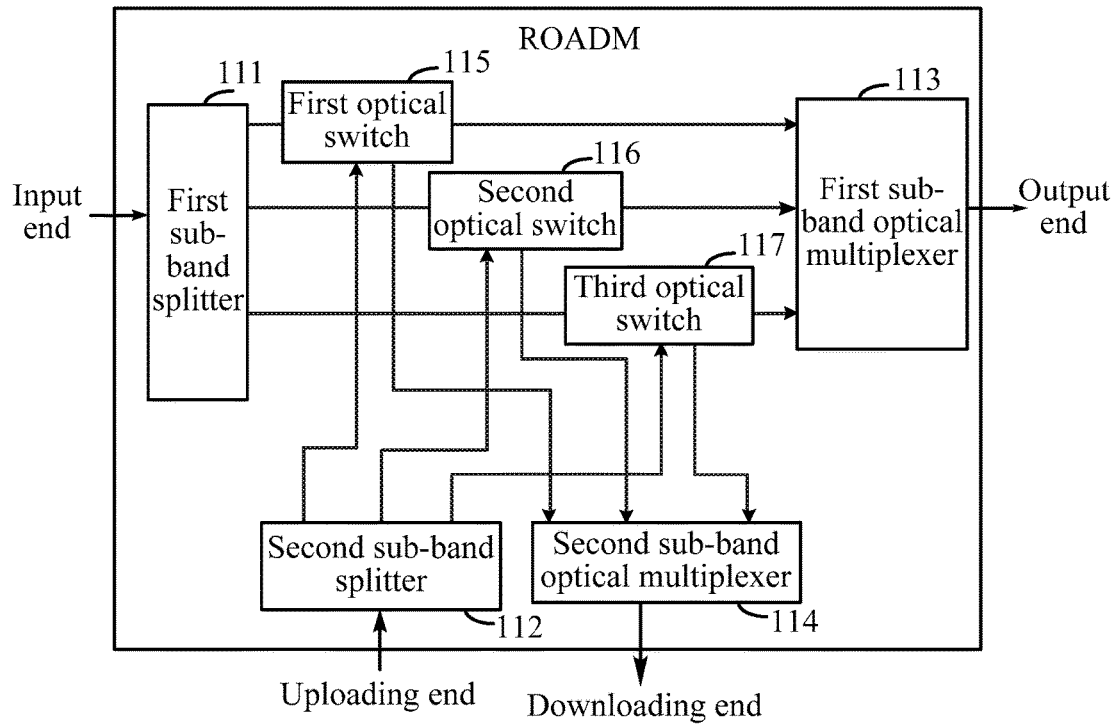
FIG. 3 is a schematic architectural diagram of an ROADM according to an embodiment of the present invention.

Further, the first ROADM 11 and the second ROADM 12 may be small-size switch array ROADMs, and preferably include: a first sub-band splitter, a second sub-band splitter, a first sub-band optical multiplexer, a second sub-band optical multiplexer, and at least one 2×2 optical switch. The number of optical switches is the same as the number of tributary ports of the first sub-band splitter, the second sub-band splitter, the first sub-band optical multiplexer, and the second sub-band optical multiplexer. Referring to FIG. 3, FIG. 3 is a schematic diagram of an architecture of an ROADM according to an embodiment of the present invention. FIG. 3 only shows three 2×2 optical switches: a first optical switch 115, a second optical switch 116, and a third optical switch 117.

A common port of a first sub-band splitter 111 is used as an input end of the ROADM; a common port of a first sub-band optical multiplexer 113 is used as an output end of the ROADM; a common port of a second sub-band splitter 112 is used as an uploading end of the ROADM; and a common port of a second sub-band optical multiplexer 114 is used as a downloading end of the ROADM.

Each tributary port of the first sub-band splitter 111 is connected in series to one tributary port of the first sub-band optical multiplexer 113 by using one optical switch. FIG. 3 only shows three tributary ports of the first sub-band splitter 111 and only shows three tributary ports of the first sub-band optical multiplexer 113, where each tributary port of the first sub-band splitter 111 is connected to one tributary port of the first sub-band optical multiplexer 113 by using the first optical switch 115, the second optical switch 116, and the third optical switch 117 respectively.

Each tributary port of the second sub-band splitter 112 is connected in series to one tributary port of the second sub-band optical multiplexer 114 by using one optical switch. FIG. 3 only shows three tributary ports of the second sub-band splitter 112 and only shows three tributary ports of the second sub-band optical multiplexer 114, where each tributary port of the second sub-band splitter 112 is connected to one tributary port of the second sub-band optical multiplexer 114 by using the first optical switch 115, the second optical switch 116, and the third optical switch 117 respectively.

Figure 4:
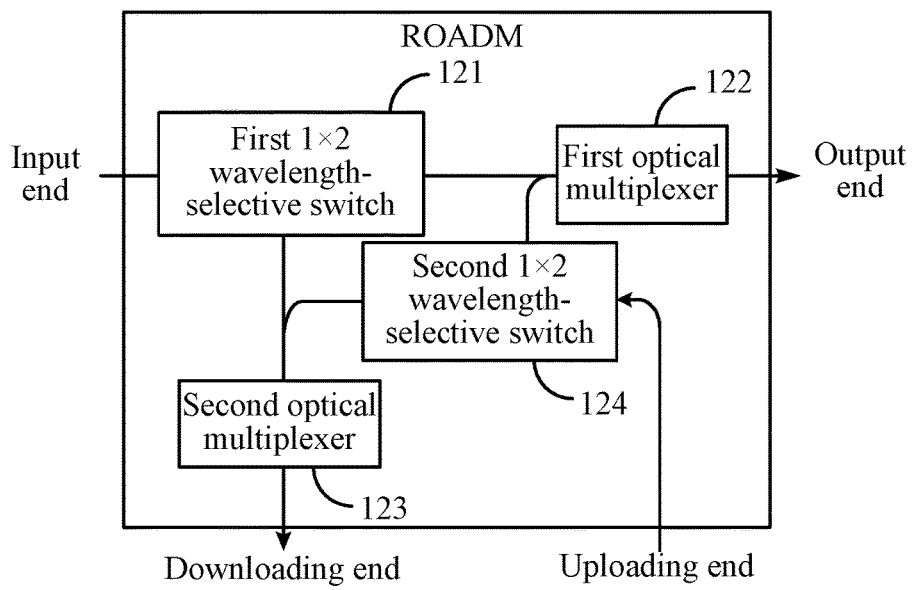
FIG. 4 is a schematic architectural diagram of an ROADM according to another embodiment of the present invention.
Figure 5:
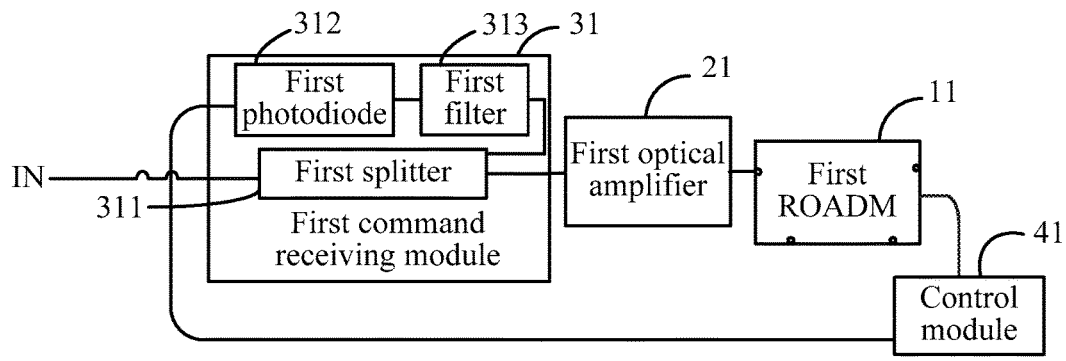
FIG. 5 is a schematic diagram of a detailed structure of a first command receiving module of a reconfigurable optical add-drop multiplexer apparatus according to an embodiment of the present invention.
Figure 6:
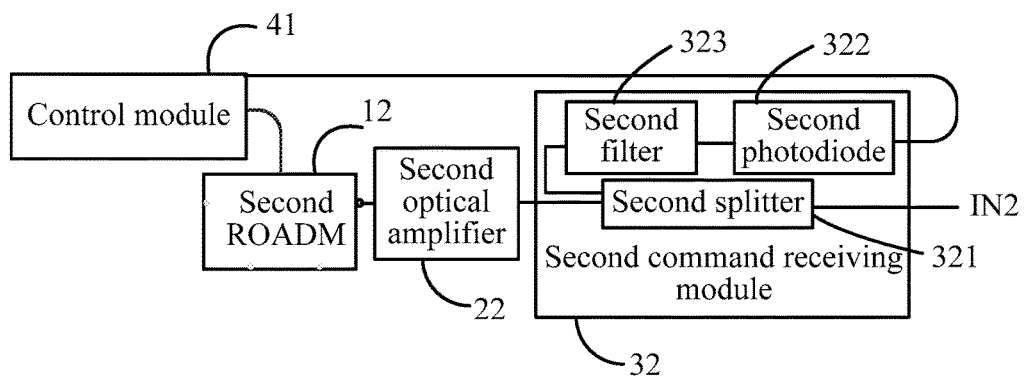
FIG. 6 is a schematic diagram of a detailed structure of a second command receiving module of a reconfigurable optical add-drop multiplexer apparatus according to an embodiment of the present invention.
Figure 7:
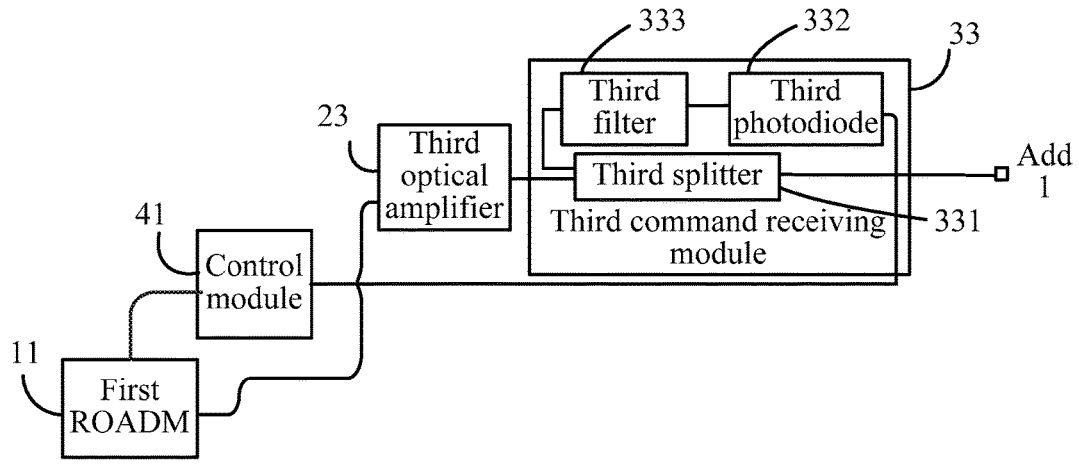
FIG. 7 is a schematic diagram of a detailed structure of a third command receiving module of a reconfigurable optical add-drop multiplexer apparatus according to an embodiment of the present invention.
Figure 8:
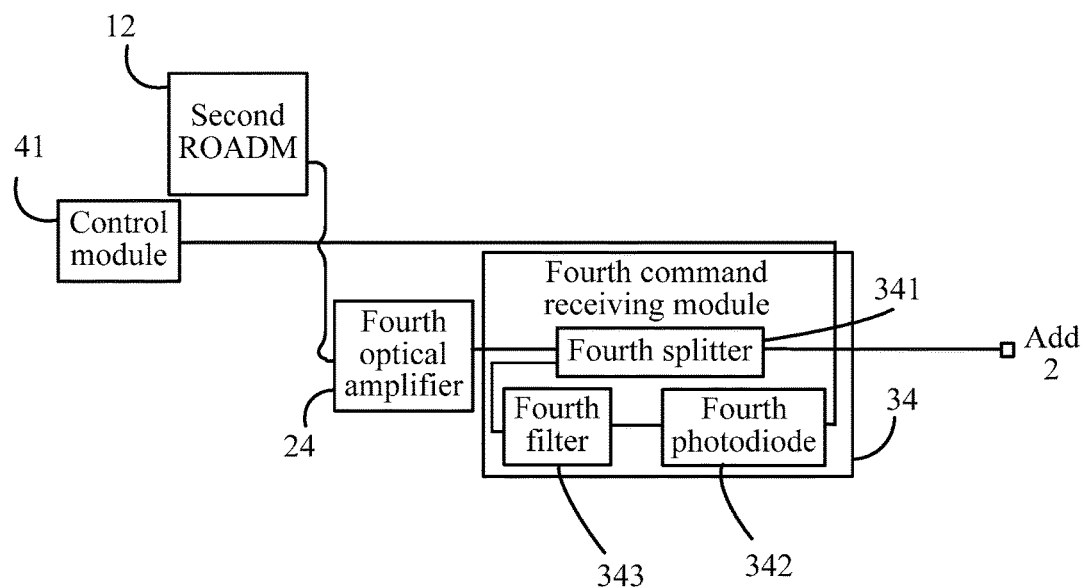
FIG. 8 is a schematic diagram of a detailed structure of a fourth command receiving module of a reconfigurable optical add-drop multiplexer apparatus according to an embodiment of the present invention.

Optionally, the ROADM may further preferably include two 1×2 wavelength selective switches and two optical multiplexers. Referring to FIG. 4, FIG. 4 is a schematic diagram of an architecture of another ROADM according to an embodiment of the present invention.

Two tributary ports of a 1×2 wavelength selective switch each is connected to a tributary port of one optical multiplexer. As shown in FIG. 4, one tributary port of a first 1×2 wavelength selective switch 121 is connected to a first optical multiplexer 122, and the other tributary port of the first 1×2 wavelength selective switch 121 is connected to a second optical multiplexer 123; and one tributary port of a second 1×2 wavelength selective switch 124 is connected to the first optical multiplexer 122, and the other tributary port of the second 1×2 wavelength selective switch 124 is connected to the second optical multiplexer 123.

A common port of one 1×2 wavelength selective switch is used as an input end of the ROADM. As shown in FIG. 4, a common port of the first 1×2 wavelength selective switch 121 is used as the input end of the ROADM.

A common port of the other 1×2 wavelength selective switch is used as an uploading end of the ROADM. As shown in FIG. 4, a common port of the second 1×2 wavelength selective switch 124 is used as the uploading end of the ROADM.

A common port of one optical multiplexer is used as an output end of the ROADM. As shown in FIG. 4, a common port of the first optical multiplexer 122 is used as the input end of the ROADM.

A common port of the other optical multiplexer is used as the downloading end of the ROADM. As shown in FIG. 4, a common port of the second optical multiplexer 123 is used as the downloading end of the ROADM.

Further, based on the foregoing solutions, a command receiving module may preferably include:

a splitter and a photodiode, where an input end of the splitter is correspondingly connected to a first input end, a second input end, a first uploading end, or a second uploading end; the photodiode is coupled to a first output end of the splitter; a second output end of the splitter is connected to an input end of a corresponding optical amplifier; and the photodiode is further connected to the control module, and is configured to convert an optical signal output by the splitter into the control command, and output the control command to the control module. Further, a filter is connected in series between the splitter and the photodiode.

Referring to FIG. 5, FIG. 6, FIG. 7, and FIG. 8, a first command receiving module 31 includes a first splitter 311, a first photodiode 312, and a first filter 313; a second command receiving module 32 includes a second splitter 321, a second photodiode 322, and a second filter 323; a third command receiving module 33 includes a third splitter 331, a third photodiode 332, and a third filter 333; and a fourth command receiving module 34 includes a fourth splitter 341, a fourth photodiode 342, and a fourth filter 343. Using the first command receiving module 31 as an example, a path connectivity signal (the path connectivity signal corresponds to a detection signal, and is used to control a transmission path of the corresponding detection signal) is input from an IN1 end. An optical signal (the optical signal includes at least: a detection signal and a path connectivity signal) input from the IN1 end is transmitted to the first command receiving module 31 and passes through the first splitter 311, and one optical signal is output to a first optical amplifier 21 and another optical signal is output to the first filter 313. The first filter 313 acquires the path connectivity signal by filtering, transmits the path connectivity signal to the first photodiode 312 and converts the path connectivity signal into an electrical signal (the control command), and transmits the electrical signal to a control module 41 to control a reconfiguration state of a first ROADM 11. The second command receiving module 32, the third command receiving module 33, and the fourth command receiving module 34 use a same principle. Certainly, the control module 41 may also control a reconfiguration state of a second ROADM 12, and the principle thereof is the same as that of the first ROADM 11. Details are not provided again.

With reference to FIG. 1 and FIG. 2, and referring to FIG. 5, FIG. 6, FIG. 7, and FIG. 8, a service signal received by an IN1 of a downlink trunk transmission line passes through the first command receiving module 31, and is amplified by the first optical amplifier 21; and then signals of some wavelengths or sub-bands are dropped from a first ROADM 11, pass through a third combiner 53, and are dropped from a Drop1 port, and signals of the same wavelengths are added from an Add1 port at the same time, pass through a first combiner 51, and are then output from an OUT1. Similarly, a service signal of an IN2 of an uplink trunk transmission line passes through the second command receiving module 32, and is amplified by the second optical amplifier 22; and then signals of some wavelengths or sub-bands are dropped from the second ROADM 12, pass through the fourth combiner 54, and are dropped from a Drop2 port, and signals with the same wavelengths are added from an Add2 port at the same time, pass through a second combiner 52, and are then output from an OUT2.

A detection device at the IN1 port of the downlink trunk transmission line sends line detection signals and path connectivity signals. One detection signal passes through the first command receiving module 31, and the other detection signal is amplified by the first optical amplifier 21 and is transmitted to the first ROADM 11, and at the same time, one path connectivity signal passes through the first command receiving module 31, and the other path connectivity signal is amplified by the first optical amplifier 21 and is transmitted to the first ROADM 11. The first command receiving module 31 acquires the path connectivity signal, generates a control command, and transmits the control command to the control module 41. The control module generates a control signal according to the control command to control the reconfiguration state of the first ROADM 11.

For example, to make the first ROADM 11 be in a non-pass-through state, the control signal can control, by using the control module 41, the first ROADM 11 to be in the non-pass-through state, so that the detection signal, after passing through the first ROADM 11, is dropped from the Drop1 port by using the third coupler 53. The detection signal generates back scattering light at the DROP1. The back scattering light is reversely input from the DROP1 port, and then passes through the third coupler 53, and is transmitted to a port 1 of a combiner 61; and the back scattering light may be transmitted to the second coupler 52 through a port 4, output from the OUT2, and received by the foregoing detection device, to perform line failure detection.

To make the first ROADM 11 be in a pass-through state, the control signal can control, by using the control module 41, the first ROADM 11 to be in the pass-through state, so that the detection signal, after passing through the first ROADM 11, is dropped from the OUT1 port by using a first coupler 51. The detection signal generates back scattering light at the OUT1. The back scattering light is reversely input from the OUT1 port, and then passes through the first coupler 51, and is transmitted to a port 2 of the combiner 61; and the back scattering light may be transmitted to the second coupler 52 through the port 4, output from the OUT2, and received by the foregoing detection device, to perform the line failure detection.

A detection device at the IN2 port of the uplink trunk transmission line sends line detection signals and path connectivity signals. After one detection signal passes through the second command receiving module 32, the other detection signal is amplified by the second optical amplifier 22, and is transmitted to the second ROADM 12, and at the same time, after one path connectivity signal passes through the second command receiving module 32, the other path connectivity signal is amplified by the second optical amplifier 22, and is transmitted to the second ROADM 12. The second command receiving module 32 acquires the path connectivity signal, generates a control command, and transmits the control command to the control module 41. The control module 41 generates a control signal according to the control command to control the reconfiguration state of the second ROADM 12.

For example, to make the second ROADM 12 be in the non-pass-through state, the control signal can control, by using the control module 41, the second ROADM 12 to be in the non-pass-through state, so that the detection signal, after passing through the second ROADM 12, is dropped from the Drop2 port by using a fourth coupler 54. The detection signal generates back scattering light at the DROP2. The back scattering light is reversely input from the DROP2 port, and then passes through the fourth coupler 54, and is transmitted to a port 3 of the combiner 61; and the back scattering light may be transmitted to the first coupler 51 through the port 2 of the combiner 61, output from the OUT1, and received by the foregoing detection device, to perform the line failure detection.

To make the second ROADM 12 be in the pass-through state, the control signal can control, by using the control module 41, the second ROADM 12 to be in the pass-through state, so that the detection signal, after passing through the second ROADM 12, is dropped from the OUT2 port by using the second coupler 52. The detection signal generates back scattering light at the OUT2. The back scattering light is reversely input from the OUT2 port, and then passes through the second coupler 52, and is transmitted to the port 4 of the combiner 61; and the back scattering light may be transmitted to the first coupler 51 through the port 2, output from the OUT1, and received by the foregoing detection device, to perform the line failure detection.

A detection device at an ADD1 port of a downlink branch transmission line sends line detection signals and path connectivity signals. One detection signal passes through the third command receiving module 33, and the other detection signal is amplified by the third optical amplifier 23, and is transmitted to the first ROADM 11, and at the same time, one path connectivity signal passes through the third command receiving module 33, and the other path of path connectivity signal is amplified by the third optical amplifier 23, and is transmitted to the first ROADM 11. The third command receiving module 33 acquires the path connectivity signal, generates a control command, and transmits the control command to the control module 41. The control module 41 generates a control signal according to the control command to control the reconfiguration state of the first ROADM 11.

For example, to make the first ROADM 11 be in the pass-through state, the control signal can control, by using the control module 41, the first ROADM 11 to be in the pass-through state, so that the detection signal, after passing through the first ROADM 11, is dropped from the Drop 1 port by using the third coupler 53. The detection signal generates back scattering light at the DROP1. The back scattering light is reversely input from the DROP1 port, and then passes through the third coupler 53, and is transmitted to the port 1 of the combiner 61; and the back scattering light may be transmitted to the fourth coupler 54 through the port 3, output from the Drop2, and received by the foregoing detection device, to perform the line failure detection.

To make the first ROADM 11 be in the non-pass-through state, the control signal can control, by using the control module 41, the first ROADM 11 to be in the non-pass-through state, so that the detection signal, after passing through the first ROADM 11, is dropped from the OUT1 port by using the first coupler 51. The detection signal generates back scattering light at the OUT1. The back scattering light is reversely input from the OUT1 port, and then passes through the first coupler 51, and is transmitted to the port 2 of the combiner 61; and the back scattering light may be transmitted to the fourth coupler 54 through the port 3, output from the DROP2, and received by the foregoing detection device, to perform the line failure detection.

A detection device at an input port ADD2 of an uplink branch transmission line sends line detection signals and path connectivity signals. One detection signal passes through the fourth command receiving module 34, and the other path of detection signal is amplified by the fourth optical amplifier 24, and is transmitted to the second ROADM 12, and at the same time, one path connectivity signal passes through the fourth command receiving module 34, and the other path connectivity signal is amplified by the fourth optical amplifier 24, and is transmitted to the second ROADM 12. The fourth command receiving module 34 acquires the path connectivity signal, generates a control command, and transmits the control command to the control module 41. The control module 41 generates a control signal according to the control command to control the reconfiguration state of the second ROADM 12.

For example, to make the second ROADM 12 be in the non-pass-through state, the control signal can control, by using the control module 41, the second ROADM 12 to be in the non-pass-through state, so that the detection signal, after passing through the second ROADM 12, is dropped from the Drop2 port by using the fourth coupler 54. The detection signal generates back scattering light at the DROP2. The back scattering light is reversely input from the DROP2 port, and then passes through the fourth coupler 54, and is transmitted to the port 3 of the combiner 61; and the back scattering light may be transmitted to the third coupler 53 through the port 1, output from the Drop1, and received by the foregoing detection device, to perform the line failure detection.

To make the second ROADM 12 be in the non-pass-through state, the control signal can control, by using the control module 41, the second ROADM 12 to be in the non-pass-through state, so that the detection signal, after passing through the second ROADM 12, is dropped from the OUT2 port by using the second coupler 52. The detection signal generates back scattering light at the OUT2. The back scattering light is reversely input from the OUT2 port, and then passes through the second coupler 52, and is transmitted to the port 4 of the combiner 61; and the back scattering light may be transmitted to the third coupler 53 through the port 1, output from the DROP1, and received by the foregoing detection device, to perform the line failure detection.

In the foregoing embodiments, the path connectivity signal, the service signal, and the detection signal are all optical signals transmitted in a line, the path connectivity signal corresponds to the detection signal, and the path connectivity signal may be included in the detection signal and input to the IN1 end together with the detection signal. Certainly, the path connectivity signal may also be included in the service signal and input to the IN1 end together with the service signal.

In this embodiment, a command receiving module acquires a control signal in a detection signal and transmits the control signal to a control module, and a line failure is detected by using a loopback transmission path provided by four couplers and one splitting coupler for a reverse optical signal, which facilitates line failure detection.

Based on the foregoing solutions, still further, the reverse optical signal further includes: a selectively reflected part of detection signals that are received by the at least one port at the first output end, the second output end, the first downloading end, and the second downloading end; the first coupler, the second coupler, the third coupler, and the fourth coupler are 2×2 couplers; a second output end of the 2×2 coupler is connected to an input end of one attenuator, and an output end of the attenuator is connected to one wavelength-selective reflector; and the wavelength-selective reflector is configured to selectively reflect a part of detection signals to form the reverse optical signal.

Figure 9:
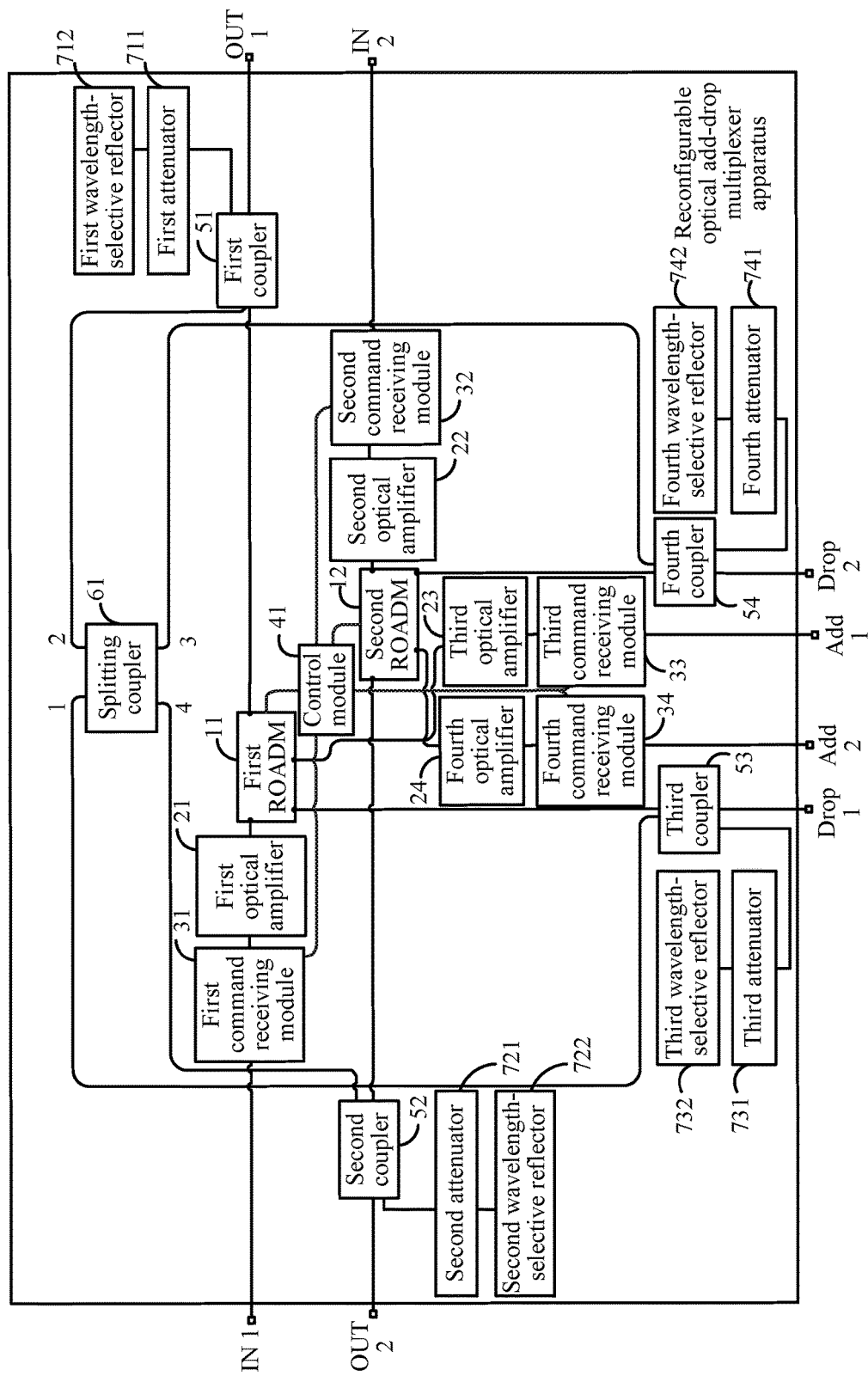
FIG. 9 is a schematic diagram of a reconfigurable optical add-drop multiplexer apparatus according to another embodiment of the present invention.

Referring to FIG. 9, FIG. 9 is a schematic diagram of a reconfigurable optical add-drop multiplexer apparatus according to another embodiment of the present invention.

In FIG. 9, a second output port of a first coupler 51 is connected to an input end of a first attenuator 711, and an output end of the first attenuator 711 is connected in series to a first wavelength-selective reflector 712. A second output end of a third coupler 53 is connected to an input end of a third attenuator 731, and an output end of the third attenuator 731 is connected in series to a third wavelength-selective reflector 732.

A second output end of a second coupler 52 is connected to an input end of a second attenuator 721, and an output end of the second attenuator 721 is connected in series to a second wavelength-selective reflector 722. A second output end of a fourth coupler 54 is connected to an input end of a fourth attenuator 741, and an output end of the fourth attenuator 741 is connected in series to a fourth wavelength-selective reflector 742.

In the reconfigurable optical add-drop multiplexer apparatus shown in FIG. 9, a reverse optical signal at an OUT1 is generated by transmitting a detection signal to the first wavelength-selective reflector 712, a reverse optical signal at an OUT2 is generated by transmitting the detection signal to the second wavelength-selective reflector 722, a reverse optical signal at a DROP1 is generated by transmitting the detection signal to the third wavelength-selective reflector 732, and a reverse optical signal at a DROP2 is generated by transmitting the detection signal to the fourth wavelength-selective reflector 742.

In the solutions, high-loss direct coupling loopback detection can be implemented by using a wavelength-selective reflector. In the reconfigurable optical add-drop multiplexer apparatus shown in FIG. 9, in addition to loopback of a back scattering signal returned in a transmission optical fiber, the wavelength-selective reflector can also couple reflected signals of a part of detection signals for fault location.

Still further, the splitting coupler 61 in the foregoing solutions optionally is implemented by a 2×2 optical switch, and the 2×2 optical switch is connected to a control module, and is configured to change a switch state under control of the control module, and couple a reverse optical signal of the detection signal generated by the first output end or the first downloading end and return the coupled reverse optical signal to the second output end for outputting;

or, couple a reverse optical signal of the detection signal generated by the second output end or the second downloading end and return the coupled reverse optical signal to the first output end for outputting;

or, couple a reverse optical signal of the detection signal generated by the first output end or the first downloading end and return the coupled reverse optical signal to the second downloading end for outputting;

or, couple a reverse optical signal of the detection signal generated by the second output end or the second downloading end and return the coupled reverse optical signal to the first downloading end for outputting, where the switch state includes a crossed state and a parallel state.

Figure 10:
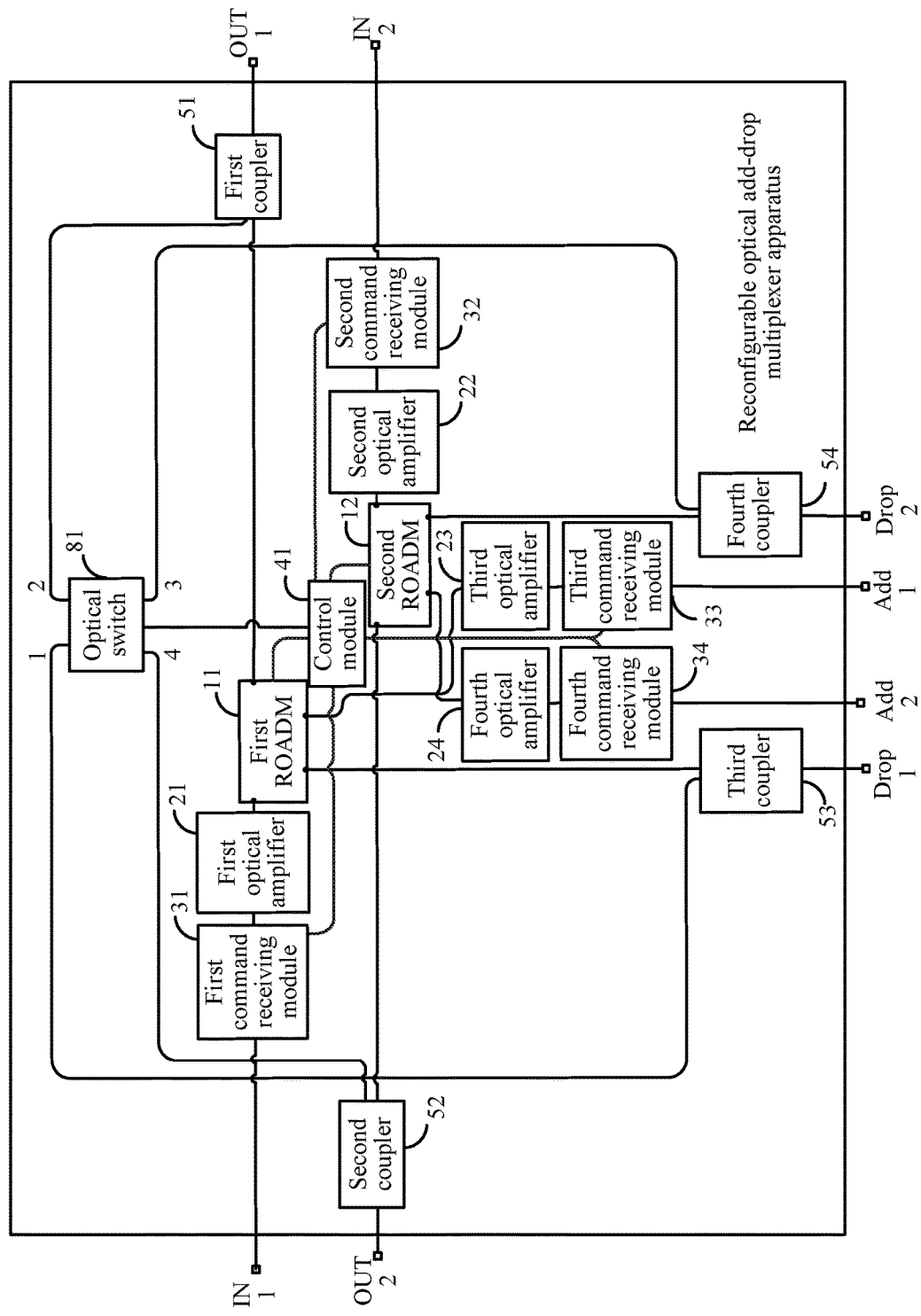
FIG. 10 is a schematic diagram of a reconfigurable optical add-drop multiplexer apparatus according to another embodiment of the present invention.
Figure 11:
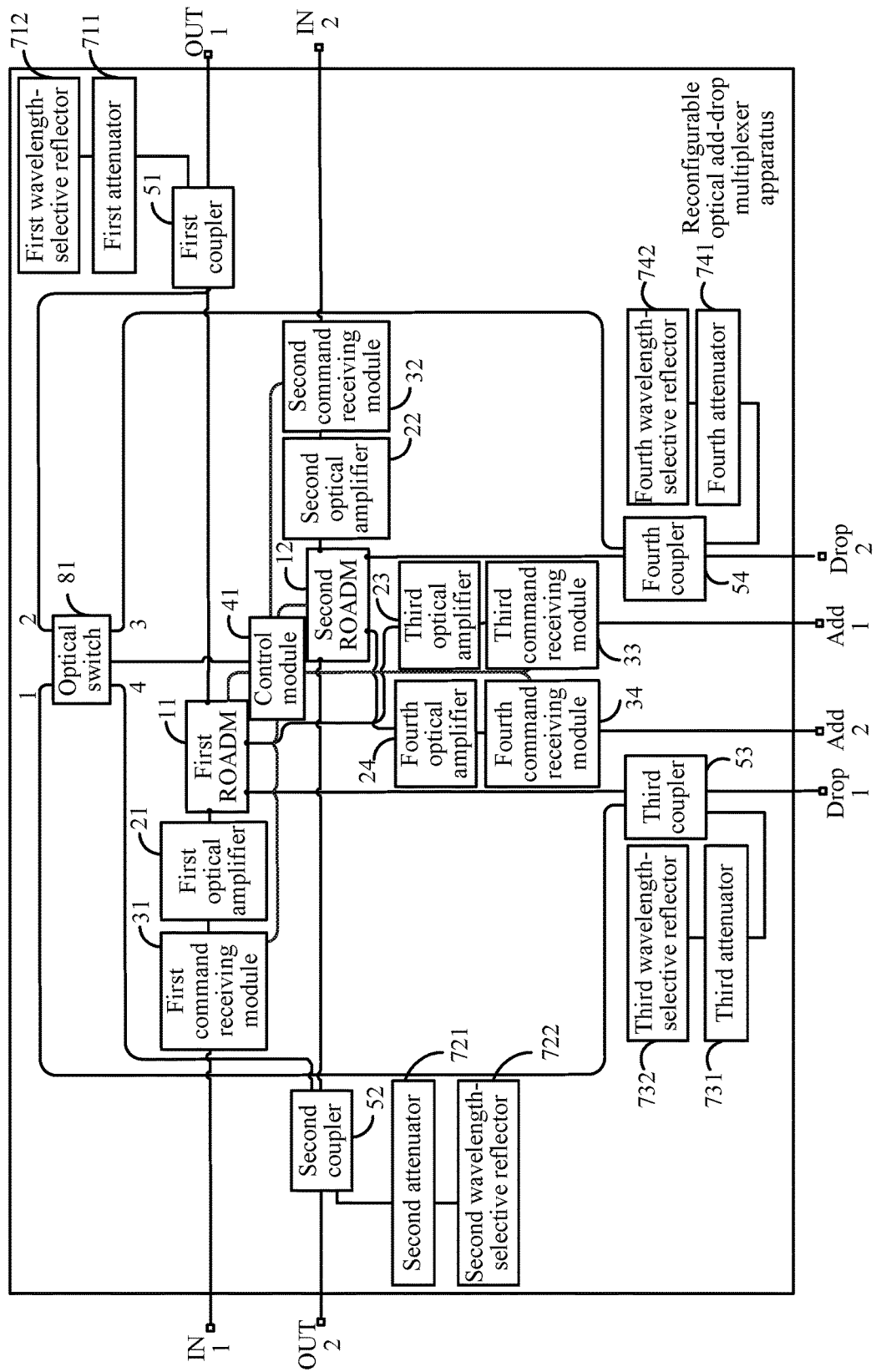
FIG. 11 is a schematic diagram of a reconfigurable optical add-drop multiplexer apparatus according to another embodiment of the present invention.

Referring to FIG. 10 and FIG. 11, FIG. 10 and FIG. 11 are schematic diagrams of reconfigurable optical add-drop multiplexer apparatuses according to embodiments of the present invention. An optical switch 81 is a 2×2 optical switch, and the 2×2 optical switch may be configured to be in a parallel state or a crossed state.

Referring to FIG. 10, a service signal input from an IN1 port of a downlink trunk transmission line passes through a first command receiving module 31, and is amplified by a first optical amplifier 21; and then signals of some wavelengths or sub-bands are dropped from a first ROADM 11, pass through a third combiner 53, and are dropped from a Drop1 port, and signals of the same wavelengths are further added from an Add1 port at the same time, pass through a first combiner 51, and are then output from an OUT1.

Similarly, a service signal of an IN2 port of an uplink trunk transmission line passes through a second command receiving module 32, and is amplified by a second optical amplifier 22; and then signals of some wavelengths or sub-bands are dropped from a second ROADM 12, pass through a fourth combiner 54, and are dropped from a Drop2 port, and signals of the same wavelengths are further added from an Add2 port at the same time, pass through a second combiner 52, and are then output from an OUT2.

Detection signals and path connectivity signals that are sent by a detection device of the downlink trunk transmission line are input to the port IN1. After one detection signal passes through the first command receiving module 31, the other detection signal is amplified by the first optical amplifier 21, and is transmitted to the first ROADM 11, and at the same time, after one path connectivity signal passes through the first command receiving module 31, the other path connectivity signal is amplified by the first optical amplifier 21, and is transmitted to the first ROADM 11. The first command receiving module 31 acquires the path connectivity signal, generates a control command, and transmits the control command to the control module 41. The control module generates a control signal according to the control command to control a reconfiguration state of the first ROADM 11.

For example, when attempting to detect a path from one trunk transmission line to another trunk transmission line, a trunk end station line detection device on the trunk transmission line controls, by using the control signal, the first ROADM 11 to be in a pass-through state and the optical switch 81 to be in the crossed state for a detection wavelength, so that the detection signal can pass through the ROADM, and after passing through the first ROADM 11, the detection signal is output from the Out1 port by using the first coupler 51. The detection signal generates back scattering light in a line optical fiber connected to the OUT1. The back scattering light is reversely input from the OUT1 port, and then passes through the first coupler 51, is transmitted to a port 2 of the optical switch 81, and output from a port 4; and then the back scattering light is transmitted to a second coupler 52, output from the OUT2, and received by the foregoing detection device, to perform line failure detection.

For example, when attempting to detect a path from a trunk transmission line to a branch transmission line, a trunk end station line detection device on the trunk transmission line controls, by using the control signal, the first ROADM 11 to be in a non-pass-through state and the optical switch 81 to be in the parallel state for a detection wavelength, so that the detection signal can pass through the ROADM, and after passing through the first ROADM 11, the detection signal is output from the Drop1 port by using the third coupler 53. The detection signal generates back scattering light in a line optical fiber connected to the Drop1. The back scattering light is reversely input from the Drop1 port, and then passes through the third coupler 53, is transmitted to a port 1 of the optical switch 81, and output from the port 4; and then the back scattering light is transmitted to the second coupler 52, output from the OUT2, and received by the foregoing detection device, to perform the line failure detection.

Similarly, line detection signals and path connectivity signals that are sent by a detection device of the uplink trunk transmission line are input to a port IN2. After one detection signal passes through the second command receiving module 32, the other detection signal is amplified by the second optical amplifier 22, and is transmitted to the second ROADM 12; and after one path connectivity signal passes through the second command receiving module 32, the other path connectivity signal is amplified by the second optical amplifier 22. The second command receiving module 32 acquires the path connectivity signal, generates a control command, and transmits the control command to the control module 41. The control module generates a control signal according to the control command to control a reconfiguration state of the second ROADM 12 and the crossed state of the optical switch 81.

For example, when attempting to detect a path from one trunk transmission line to another trunk transmission line, a trunk end station line detection device controls, by using the control signal, the second ROADM 12 to be in the pass-through state and the optical switch 81 to be in the crossed state for a detection wavelength, so that the detection signal can pass through the ROADM, and after passing through the second ROADM 12, the detection signal is output from the Out2 port by using the second coupler 52. The detection signal generates back scattering light in a line optical fiber connected to the OUT2. The back scattering light is reversely input from the OUT2 port, and then passes through the second coupler 52, is transmitted to a port 4 of the optical switch 81, and output from the port 2; and then the back scattering light is transmitted to the first coupler 51, output from the OUT1, and received by the foregoing detection device, to perform the line failure detection.

For example, when attempting to detect a path from a trunk transmission line to a branch transmission line, a trunk end station line detection device controls, by using the control signal, the second ROADM 12 to be in the non-pass-through state and the optical switch 81 to be in the parallel state for a detection wavelength, so that the detection signal can pass through the ROADM, and after passing through the second ROADM 12, the detection signal is output from the Drop2 port by using the fourth coupler 54. The detection signal generates back scattering light in the line optical fiber connected to the Drop2. The back scattering light is reversely input from the Drop2 port, and then passes through the fourth coupler 54, is transmitted to a port 3 of the optical switch 81, and output from the port 2; and then the back scattering light is transmitted to the first coupler 51, output from the OUT1, and received by the foregoing detection device, to perform the line failure detection.

Line detection signals and path connectivity signals sent by a detection device of a downlink branch transmission line are input to the port ADD1. After one detection signal passes through the third command receiving module 33, the other path of detection signal is amplified by the third optical amplifier 23, and is transmitted to the first ROADM 11; and after one path connectivity signal passes through the third command receiving module 33, the other path connectivity signal is amplified by the third optical amplifier 23, and is transmitted to the first ROADM 11. The third command receiving module 33 acquires the path connectivity signal, generates a control command, and transmits the control command to the control module 41. The control module generates a control signal according to the control command to control the reconfiguration state of the first ROADM 11 and the crossed state of the optical switch 81.

For example, when attempting to detect a path from a branch transmission line to a trunk transmission line, a downlink branch end station line detection device controls, by using the control signal, the first ROADM 11 to be in the non-pass-through state and the optical switch 81 to be in the parallel state for a detection wavelength, so that the detection signal can pass through the ROADM, and after passing through the first ROADM 11, the detection signal is output from the Out1 port by using the first coupler 51. The detection signal generates back scattering light in the line optical fiber connected to the OUT1. The back scattering light is reversely input from the OUT1 port, and then passes through the first coupler 51, is transmitted to a port 2 of the optical switch 81, and output from the port 3; and then the back scattering light is transmitted to the fourth coupler 54, output from the Drop2, and received by the foregoing detection device, to perform the line failure detection.

For example, when attempting to detect a path of a branch transmission line, a branch downlink line detection device controls, by using the control signal, the first ROADM 11 to be in the pass-through state and the optical switch 81 to be in the crossed state for a detection wavelength, so that the detection signal can pass through the ROADM, and after passing through the first ROADM 11, a branch detection signal is output from the Drop1 port by using the third coupler 53. The detection signal generates back scattering light in the line optical fiber connected to the Drop1. The back scattering light is reversely input from the Drop1 port, and then passes through the third coupler 53, is transmitted to a port 1 of the optical switch 81, and output from the port 3; and then the back scattering light is transmitted to the fourth coupler 54, output from the DROP2, and received by the foregoing detection device, to perform the line failure detection.

Similarly, line detection signals and path connectivity signals sent by a detection device of an uplink branch transmission line are input to the port ADD2. After one detection signal passes through a fourth command receiving module 34, the other detection signal is amplified by a fourth optical amplifier 24, and is transmitted to the second ROADM 12; and after one path connectivity signal passes through the fourth command receiving module 34, the other path connectivity signal is amplified by the fourth optical amplifier 24, and is transmitted to the second ROADM 12. The fourth command receiving module 34 acquires the path connectivity signal, generates a control command, and transmits the control command to the control module 41. The control module generates a control signal according to the control command to control the reconfiguration state of the second ROADM 12 and the crossed state of the optical switch 81.

For example, when attempting to detect a path from a branch to a trunk transmission line, an uplink branch end station line detection device controls, by using the control signal, the second ROADM 12 to be in the non-pass-through state and the optical switch 81 to be in the parallel state for a detection wavelength, so that the detection signal can pass through the ROADM, and after passing through the second ROADM 12, the detection signal is output from the Out2 port by using the second coupler 52. The detection signal generates back scattering light in the line optical fiber connected to the OUT2. The back scattering light is reversely input from the OUT2 port, and then passes through the second coupler 52, is transmitted to the port 4 of the optical switch 81, and output from the port 1; and then the back scattering light is transmitted to the third coupler 53, output from the Drop1, and received by the foregoing detection device, to perform the line failure detection.

For example, when attempting to detect a path of a branch transmission line, a branch uplink line detection device controls, by using the control signal, the second ROADM 12 to be in the pass-through state and the optical switch 81 be in the crossed state for a detection wavelength, so that the detection signal can pass through the ROADM, and a back scattering signal of the detection signal can be returned from a reverse path. After an uplink branch detection signal passes through the second ROADM 12, the uplink branch detection signal is output from the Drop2 port by using the fourth coupler 54. The detection signal generates back scattering light in the line optical fiber connected to the Drop2. The back scattering light is reversely input from the Drop2 port, and then passes through the fourth coupler 54, is transmitted to the port 3 of the optical switch 81, and output from the port 1; and then the back scattering light is transmitted to the third coupler 53, output from the DROP1, and received by the foregoing detection device, to perform the line failure detection.

Further, based on the foregoing solutions corresponding to FIG. 10, referring to FIG. 11, FIG. 11 is a schematic diagram of a reconfigurable optical add-drop multiplexer apparatus according to another embodiment of the present invention.

In FIG. 11, a second output port of a first coupler 71 is connected to an input end of a first attenuator 711, and an output end of the first attenuator 711 is connected in series to a first wavelength-selective reflector 712. A second output end of a third coupler 73 is connected to an input end of a third attenuator 731, and an output end of the third attenuator 731 is connected in series to a third wavelength-selective reflector 732.

A second output end of a second coupler 72 is connected to an input end of a second attenuator 721, and an output end of the second attenuator 721 is connected in series to a second wavelength-selective reflector 722. A second output end of a fourth coupler 74 is connected to an input end of a fourth attenuator 741, and an output end of the fourth attenuator 741 is connected in series to a fourth wavelength-selective reflector 742.

In the reconfigurable optical add-drop multiplexer apparatus shown in FIG. 11, in addition to loopback of a back scattering signal returned in a transmission optical fiber, the wavelength-selective reflector can also couple reflected signals of a part of detection signals for failure location. For example, the first wavelength-selective reflector 712 may reflect a part of detection signals in a downlink trunk transmission line or a downlink branch transmission line, the second wavelength-selective reflector 722 may reflect a part of detection signals in an uplink trunk transmission line or an uplink branch transmission line, the third wavelength-selective reflector 732 may reflect a part of detection signals in the downlink trunk transmission line or the uplink branch transmission line, and the fourth wavelength-selective reflector 742 may reflect a part of detection signals in the uplink trunk transmission line or the downlink branch transmission line.

Based on implementation of a back scattering signal line failure detection method, the solutions can further compatibly implement high-loss direct coupling loopback signal line failure detection by configuring a wavelength-selective reflector.

A state of a 2×2 optical switch is controlled, so that back scattering light of the detection signal is accurately received by a detection device, which accurately locates a line failure problem.

Optionally, based on the foregoing solutions shown in FIG. 10 and FIG. 11, a command receiving module may preferably include: a splitter and a photodiode.

An input end of the splitter is correspondingly connected to a first input end, a second input end, a first uploading end, or a second uploading end; the photodiode is coupled to a first output end of the splitter; a second output end of the splitter is connected to an input end of a corresponding optical amplifier; and the photodiode is further connected to the control module, and is configured to convert an optical signal output by the splitter into the control command, and output the control command to the control module. Further, a filter is connected in series between the splitter and the photodiode. Specifically, for the structure of each command receiving module, refer to FIG. 5, FIG. 6, FIG. 7, and FIG. 8 and the descriptions of the corresponding embodiments, and details are not provided herein again.

In this embodiment, a command receiving module controls a reconfiguration state of an ROADM by using a control module, and a line failure is detected by using a loopback transmission path provided by four couplers and one splitting coupler for a reverse optical signal, which facilitates line failure detection.

In the foregoing embodiments, for that a 2×2 coupler includes a first input port, a second input port, a first output port, and a second output port, it may be understood that, the first and the second are not intended to limit the present invention, but are merely for a clear description. According to knowledge widely known by a person skilled in the art, functions of two input ports of the 2×2 coupler are no different. Similarly, the two input ports are no different. Similarly, a similar description about another optical switch and a multi-port device should all fall within the scope of the explanation. If only a naming sequence of ports is replaced, it falls within the protection scope of the present invention. The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A reconfigurable optical add-drop multiplexer apparatus, comprising:
   a first input end, a first output end, a second input end, a second output end, a first downloading end, a second downloading end, a first uploading end, and a second uploading end, wherein
   the first input end is connected to an input end of a first optical amplifier, an output end of the first optical amplifier is connected to an input end of a first reconfigurable optical add-drop multiplexer ROADM, and an output end of the first ROADM is connected to the first output end;
   the first uploading end is connected to an input end of a third optical amplifier, an output end of the third optical amplifier is connected to an uploading end of the first ROADM, and a downloading end of the first ROADM is connected to the first downloading end;
   the second input end is connected to an input end of a second optical amplifier, an output end of the second optical amplifier is connected to an input end of a second ROADM, and an output end of the second ROADM is connected to the second output end;
   the second uploading end is connected to an input end of a fourth optical amplifier, an output end of the fourth optical amplifier is connected to an uploading end of the second ROADM, and a downloading end of the second ROADM is connected to the second downloading end;

a first coupler is disposed between the output end of the first ROADM and the first output end, wherein a first input end of the first coupler is connected to the output end of the first ROADM, and a first output end of the first coupler is connected to the first output end;
a second coupler is connected between the output end of the second ROADM and the second output end, wherein a first input end of the second coupler is connected to the output end of the second ROADM, and a first output end of the second coupler is connected to the second output end;
a third coupler is connected between the downloading end of the first ROADM and the first downloading end, wherein a first input end of the third coupler is connected to the downloading end of the first ROADM, and a first output end of the third coupler is connected to the first downloading end; and
a fourth coupler is connected between the downloading end of the second ROADM and the second downloading end, wherein a first input end of the fourth coupler is connected to the downloading end of the second ROADM, and a first output end of the fourth coupler is connected to the second downloading end, wherein
a second input end of the first coupler is connected to a first input end of a splitting coupler, a second input end of the second coupler is connected to a first output end of the splitting coupler, a second input end of the third coupler is connected to a second input end of the splitting coupler, and a second input end of the fourth coupler is connected to a second output end of the splitting coupler; and
the splitting coupler is configured to couple a reverse optical signal received by the first output end or the first downloading end and return the coupled reverse optical signal to the second output end for outputting;
or, couple a reverse optical signal received by the second output end or the second downloading end and return the coupled reverse optical signal to the first output end for outputting;
or, couple a reverse optical signal received by the first output end or the first downloading end and return the coupled reverse optical signal to the second downloading end for outputting;
or, couple a reverse optical signal received by the second output end or the second downloading end and return the coupled reverse optical signal to the first downloading end for outputting.

2. The apparatus according to claim 1, wherein the reconfigurable optical add-drop multiplexer apparatus further comprises: four command receiving modules and one control module:
a first command receiving module disposed between the first input end and the first optical amplifier, wherein an input end of the first command receiving module is connected to the first input end, and an output end of the first command receiving module is connected to the input end of the first optical amplifier;
a second command receiving module disposed between the second input end and the second optical amplifier, wherein an input end of the second command receiving module is connected to the second input end, and an output end of the second command receiving module is connected to the input end of the second optical amplifier;
a third command receiving module disposed between the first uploading end and the third optical amplifier, wherein an input end of the third command receiving module is connected to the first uploading end, and an output end of the third command receiving module is connected to the input end of the third optical amplifier; and
a fourth command receiving module disposed between the second uploading end and the fourth optical amplifier, wherein an input end of the fourth command receiving module is connected to the second uploading end, and an output end of the fourth command receiving module is connected to the input end of the fourth optical amplifier, wherein
a control command output end of the first command receiving module, a control command output end of the second command receiving module, a control command output end of the third command receiving module, and a control command output end of the fourth command receiving module are all connected to the control module, and are configured to input a control command to the control module according to a received path connectivity signal, and the control module is further connected to the first ROADM and the second ROADM, and is configured to convert the control command into a control signal and send the control signal to the first ROADM or the second ROADM, so as to change a reconfiguration state of a corresponding ROADM.

3. The apparatus according to claim 2, wherein each command receiving module comprises:
a splitter and a photodiode, wherein
an input end of the splitter is correspondingly connected to the first input end, the second input end, the first uploading end, or the second uploading end; an input end of the photodiode is coupled to a first output end of the splitter; a second output end of the splitter is connected to an input end of a corresponding optical amplifier; and an output end of the photodiode is connected to the control module, and is configured to convert a path connectivity signal output by the splitter into a control command and output the control command to the control module.

4. The apparatus according to claim 3, wherein a filter is connected in series between the splitter and the photodiode.

5. The apparatus according to claim 2, wherein the splitting coupler is a 2×2 optical switch, and the 2×2 optical switch is connected to the control module, and is configured to change a switch state under control of the control module, and couple a reverse optical signal generated by the first output end or the first downloading end and return the coupled reverse optical signal to the second output end for outputting;
or, couple a reverse optical signal generated by the second output end or the second downloading end and return the coupled reverse optical signal to the first output end for outputting;
or, couple a reverse optical signal generated by the first output end or the first downloading end and return the coupled reverse optical signal to the second downloading end for outputting;
or, couple a reverse optical signal generated by the second output end or the second downloading end and return the coupled reverse optical signal to the first downloading end for outputting, wherein
the switch state comprises a crossed state and a parallel state.

6. The apparatus according to claim 1, wherein the splitting coupler is a 2×2 coupler.

7. The apparatus according to claim 1, wherein
the first input end, the second input end, the first uploading end, and the second uploading end are configured to input a detection signal; and
the reverse optical signal comprises back scattering light of the detection signal received by at least one port at the first output end, the second output end, the first downloading end, and the second downloading end.

8. The apparatus according to claim 7, wherein
the reverse optical signal further comprises: a selectively reflected part of detection signals received by at least one port at the first output end, the second output end, the first downloading end, and the second downloading end;
at least one of the first coupler, the second coupler, the third coupler, and the fourth coupler is a 2×2 coupler;
a second output end of the 2×2 coupler is connected to an input end of one attenuator, and an output end of the attenuator is connected to one wavelength-selective reflector; and
the wavelength-selective reflector is configured to selectively reflect a part of detection signals to form the reverse optical signal.

* * * * *